(12) United States Patent
Salmon (10) Patent No.: US 6,663,045 B2
(45) Date of Patent: Dec. 16, 2003

(54) METHOD AND APPARATUS FOR ACTUATING AN AIRCRAFT NOSE PORTION

(75) Inventor: James J. Salmon, Kirkland, WA (US)

(73) Assignee: The Boeing Company, Seattle, WA (US)

(*) Notice: Subject to any disclaimer, the term of this patent is extended or adjusted under 35 U.S.C. 154(b) by 0 days.

(21) Appl. No.: 10/073,496

(22) Filed: Feb. 11, 2002

(65) Prior Publication Data

US 2003/0150956 A1 Aug. 14, 2003

(51) Int. Cl.[7] .................................................. B64G 1/14
(52) U.S. Cl. ............................................. 244/120; 244/2
(58) Field of Search ................................ 244/120, 119, 244/2

(56) References Cited

U.S. PATENT DOCUMENTS

| | | | |
|---|---|---|---|
| 1,325,377 A | 12/1919 | Richards | 244/56 |
| 2,872,137 A | 2/1959 | Gluhareff | 244/120 |
| 3,114,525 A | 12/1963 | Morgan et al. | 244/120 |
| 3,150,849 A | 9/1964 | Conway et al. | |
| 3,171,620 A | 3/1965 | Walley et al. | 244/120 |
| 3,335,981 A | 8/1967 | Pauli et al. | 244/102 R |
| 3,433,439 A | 3/1969 | Brame et al. | 244/120 |
| 3,653,615 A | 4/1972 | Spence | 244/137.1 |
| 3,654,811 A | 4/1972 | Peterson | 74/101 |
| 3,966,142 A | 6/1976 | Corbett et al. | 244/12.4 |
| 4,116,405 A | 9/1978 | Bacchi et al. | |
| 4,379,533 A | 4/1983 | Caldwell et al. | |
| 6,129,308 A | 10/2000 | Nastasi et al. | 244/36 |
| 6,193,187 B1 | 2/2001 | Scott et al. | 244/2 |

FOREIGN PATENT DOCUMENTS

EP 0372675 6/1990

OTHER PUBLICATIONS

Copy of European Search Reporter for EP Application No. 03075275.2, The Boeing Company, Apr. 22, 2003 (3 pages).
International Standards and Recommended Practices, Aerodromes, Annex 14 to the Convention on International Civil Aviation, vol. I, Aerodrome Design and Operations, Third Edition, Jul. 1999 (p. 29).
U.S. Department of Transportation, Federal Aviation Administration, Advisory Circular, "Planning and Design Guidelines for Airport Terminal Facilities," Apr. 22, 1988 (pp. 30, 26, Fig. 4–8).
Concorde Technical Specs, http://www.concordesst.com/dimentions.html Accessed Nov. 6, 2001.
Concorde Inside, http://www.concordesst.com/inside/1.html Accessed Nov. 6, 2001.
The Encyclopedia of World Air Power, "Lockheed C–5 Galaxy," Aerospace Publishing Limited, 1980, 1986 (pp. 183–185).

Primary Examiner—Charles T. Jordan
Assistant Examiner—Stephen A Holzen
(74) Attorney, Agent, or Firm—Perkins Coie LLP (57) ABSTRACT

A method and apparatus for actuating an aircraft nose portion. The aircraft can have a longitudinal axis and a pitch axis generally transverse to the longitudinal axis. The fuselage can include a pressure bulkhead and a pressurized payload portion aft of the pressure bulkhead. The nose portion can be positioned forward of the pressure bulkhead and can be changeable from a first configuration to a second configuration while the pressurized payload portion is capable of being pressurized relative to a region external to the aircraft. For example, the nose portion can be inclined upwardly relative to the longitudinal axis when pivoted from a first position to a second position. Accordingly, the length of the aircraft can be reduced, for example, to accommodate the aircraft at a loading gate or other ground support area.

82 Claims, 4 Drawing Sheets

METHOD AND APPARATUS FOR ACTUATING AN AIRCRAFT NOSE PORTION

CROSS REFERENCE TO RELATED APPLICATION present application is related to co-pending U.S. patent application No. 09/815,390, filed Mar. 22, 2001 and incorporated herein in its entirety by reference.

BACKGROUND

The present invention relates generally to methods and apparatus for actuating an aircraft nose portion. Some conventional transport aircraft have nose portions that move relative to the rest of the aircraft. For example, the European Concorde supersonic aircraft has a nose portion that droops downwardly during approach and landing to give the pilot increased downward visibility when the aircraft is at a high angle of attack. Other aircraft have nose portions that move to allow access to the interior of the aircraft. For example, the Lockheed C-5 aircraft has a nose portion that swings upwardly to open the fuselage for loading and unloading. Other aircraft, such as those disclosed in U.S. Pat. Nos. 3,150,849; 4,116,405; and 4,379,553 disclose nose portions that swing to the side to allow access to the aircraft interior. However, none of the foregoing designs address the issues addressed by the present invention.

SUMMARY

The present invention is directed toward methods and apparatus for actuating an aircraft nose portion. An aircraft in accordance with one aspect of the invention includes a fuselage having a longitudinal axis and a pitch axis generally transverse to the longitudinal axis. The fuselage can include a pressure bulkhead, a pressurized payload portion aft of the pressure bulkhead, and a nose portion forward of the pressure bulkhead. The nose portion can be pivotable relative to the pressurized payload portion about a pivot axis generally parallel to the pitch axis while the pressurized payload portion is capable of being pressurized relative to a region external to the aircraft. The nose portion can be pivotable between a first position and a second position, with the nose portion being generally aligned with the longitudinal axis when in the first position, and with the nose portion being inclined upwardly relative to the longitudinal axis when the nose portion is in the second position.

In another aspect of the invention, the aircraft can include a pivot support member projecting forward from the pressure bulkhead, with the pivot support member being received in a corresponding slot of the nose portion. A pivot pin can be pivotably coupled between the pivot support member and the nose portion, and an actuator can be operatively coupled to the nose portion to move the nose portion between the first and second positions.

In yet a further aspect of the invention, the nose portion can change from a first configuration with the nose portion and the fuselage having a combined first length to a second configuration with the nose portion and the fuselage having a combined second length of about 5 percent or more shorter than the first length. For example, the nose portion can pivot between the first and second configurations. In still a further aspect of the invention, the nose portion can be inclined upwardly at an angle of approximately 90 degrees relative to the longitudinal axis when it is in its second configuration.

The present invention is also directed toward a method for reducing a length of an aircraft during operation. The method can include flying the aircraft while the aircraft has a first length, landing the aircraft, and pivoting a nose portion of the aircraft upwardly to reduce the length of the aircraft to a second length. The method can further include moving the aircraft with the second length relative to an unloading area, and unloading the aircraft at the unloading area only through one or more openings that are spaced apart from the nose portion.

A method in accordance with another aspect of the invention includes at least partially sealing a pressurized portion of an aircraft fuselage so that the pressurized portion is capable of being pressurized relative to a region external to the fuselage. The fuselage can have a longitudinal axis and a pitch axis generally transverse to the longitudinal axis, and the method can further include pivoting a nose portion of the aircraft relative to the pressurized portion about a pivot axis that is generally parallel to the pitch axis. Pivoting the nose portion can include pivoting the nose portion from a first position with the nose portion generally aligned with the longitudinal axis to a second position with the nose portion inclined upwardly relative to the longitudinal axis while the pressurized portion is capable of being pressurized relative to a region external to the fuselage. In a further aspect of the invention, the nose portion can be pivoted downwardly while the aircraft is in flight or in preparation for flight.

DETAILED DESCRIPTION

The present disclosure describes methods and apparatus for moving an aircraft nose portion. For example, the aircraft can include a nose portion that pivots upwardly to effectively shorten the length of the aircraft and allow the aircraft to be parked at terminals that have a limited capacity for long aircraft.

Many specific details of certain embodiments of the invention are set forth in the following description and in FIGS. 1–5 to provide a thorough understanding of these embodiments. One skilled in the art, however, will understand that the present invention may have additional embodiments, and that the invention may be practiced without several of the details described below.

The aerodynamic efficiency of an aircraft depends, in part, upon the shape of the aircraft nose. Longer, "skinny" noses generally result in lower aircraft drag, but also extend the total aircraft length if all other parametric variables are held constant. Total aircraft length is typically constrained by airport gate size limitations. Accordingly, conventional aircraft designs typically include a compromise between aircraft length, seat count, and high-speed drag. For example, many commercial transport aircraft have noses that are less than optimally efficient because they are blunted in order to fit the aircraft at existing airport gates.

Figure 1:
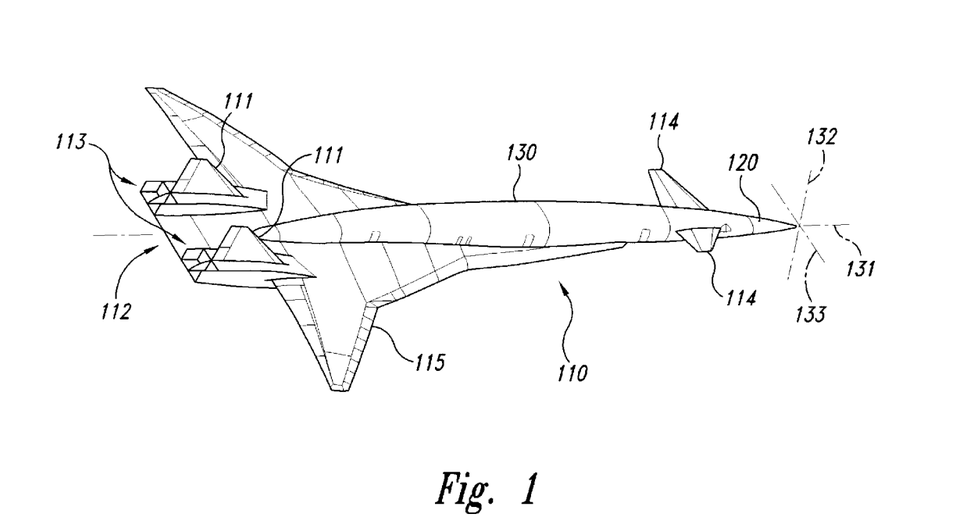
FIG. 1 is a rear isometric view of an aircraft having a movable nose portion in accordance with an embodiment of the invention.

FIG. 1 is a rear isometric view of an aircraft 110 having a pivoting nose portion 120 in accordance with an embodiment of the invention. In one aspect of this embodiment, the aircraft 110 can be configured for cruise at supersonic Mach numbers and can include a fuselage 130 elongated along a longitudinal axis 131. The aircraft 110 can further include a swept delta wing 115, canards 114, tails 111, and propulsion systems 113 integrated with an aft body 112. In other embodiments, the aircraft 110 can include other configurations and/or can have other cruise Mach numbers, such as a subsonic cruise Mach number above about 0.95. In any of these embodiments, the aircraft 110 can yaw about a yaw axis 132 and pitch about a pitch axis 133. The nose portion 120 can pivot about an axis generally parallel to the pitch axis 133 to effectively shorten the length of the aircraft 110 on the ground, as described in greater detail below with reference to FIGS. 2–5.

Figure 2:
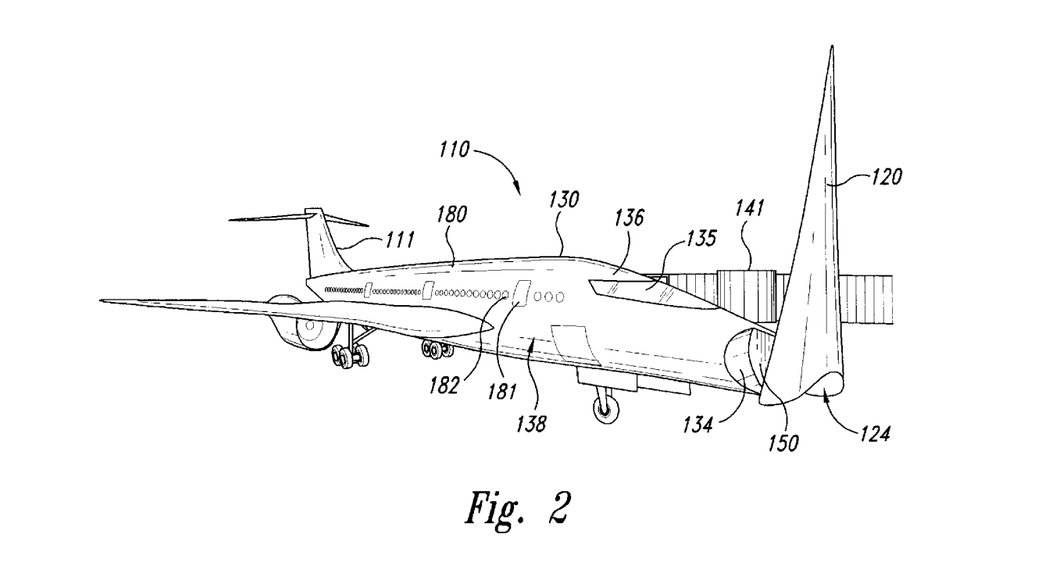
FIG. 2 is a front isometric view of an aircraft having a movable nose portion in accordance with another embodiment of the invention.

FIG. 2 is a front isometric view of another embodiment of the aircraft 110 having a single tail 111 and no canards. The aircraft fuselage 130 can include a forward pressure bulkhead 134 which can define the forwardmost extent of a pressurized payload portion 138 of the aircraft 110. The pressurized payload portion 138 can include a flight deck 136 and a cabin portion 180 positioned aft of the flight deck 136. The, flight deck 136 can include a windshield 135, and the, cabin portion 180 can include windows 182 and doors 181. In one embodiment, at least one of the doors 181 on the left side of the aircraft (not visible in FIG. 2) can be accessed by a jetway 141 in a conventional manner to allow passengers to enter in and exit the aircraft 110.

The aircraft 110 can further include a pivot support member 150 projecting forward of the forward pressure bulkhead 134. The pivot support member 150 can be pivotably coupled to the nose portion 120 to allow the nose portion 120 to rotate relative to the pressurized payload portion 138. Accordingly, the nose portion 120 can include a slot 124 that receives the pivot support member 150, as described in greater detail below with reference to FIGS. 3A–5. In other embodiments, the aircraft 110 can include other arrangements that also allow motion (such as rotational motion) of the nose portion 120 related to the rest of the aircraft 110 .

Figure 3A:
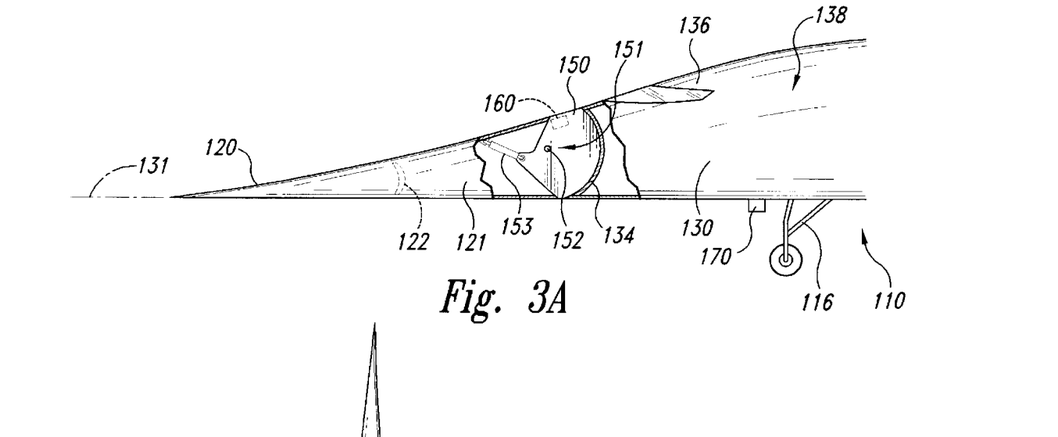
FIG. 3A is a partially schematic, side elevational view of an aircraft having a movable nose portion generally aligned with a longitudinal axis of the aircraft.

FIG. 3A is a partially schematic, side elevational view of a forward portion of an aircraft 110 having a pivotable nose portion 120 that pivots in accordance with an embodiment of the invention. The nose portion 120 of the aircraft 110 can include an external skin 121 which, for purposes of illustration, has been shown partially removed in the region where the nose portion 120 joins with the rest of the fuselage 130. The nose portion 120 can be joined to the pivot support member 150 with a pivot pin 152 so as to rotate relative to the fuselage 130 about a pivot axis 151 that is at least approximately parallel to the pitch axis 133 (FIG. 1) of the aircraft 110. In a further aspect of this embodiment, the aircraft 110 can further include an actuator 153 coupled between the pivot support member 150 and the nose portion 120 to rotate the nose portion 120 relative to the fuselage 130. In other embodiments, the aircraft 110 can include other arrangements for moving the nose portion 120. In any of these embodiments, the nose portion 120 can be movable between a first position (shown in FIG. 3A) with the nose portion 120 generally aligned with the longitudinal axis 131 of the aircraft 110, and a second position with the nose portion inclined relative to the longitudinal axis 131, as described in greater detail below with reference to FIG. 3B.

In one aspect of an embodiment of the aircraft 110 shown in FIG. 3A, the nose portion 120 can be unpressurized and can house components, such as a radar 122, that do not require a pressurized environment during aircraft operation. In an alternative embodiment, the nose portion 120 can be pressurized to the same level as the pressurized payload portion 138. For example, the nose portion 120 can be coupled with a flexible, fluid-tight coupling to the pressurized payload portion 138. In another alternate embodiment, the nose portion 120 can be pressurized to an intermediate level above the pressure external to the aircraft 110, but below the pressure in the pressurized payload portion 138. In either alternate embodiment, the nose portion 120 can house components that operate in a pressurized or partially pressurized environment.

In a further aspect of an embodiment of the aircraft 110, a restraint 160 (shown schematically in FIG. 3A) can be operatively coupled to the nose portion 120 to prevent inadvertent movement of the nose portion 120 from the first position shown in FIG. 3A. For example, the restraint 160 can include a mechanism generally similar to a conventional latch for an aircraft access door or landing gear hatch. The restraint 160 can be selectively engaged with the nose portion 120 to prevent movement of the nose portion 120 relative to the fuselage 130, and disengaged with the nose portion 120 to allow for movement of the nose portion 120 relative to the fuselage 130.

The aircraft 110 can further include a camera 170 positioned to capture a forward-facing image from the aircraft 110. Accordingly, the camera 170 can be coupled to the flight deck 136 to provide the pilot with a video image of the region forward of the aircraft 110 when the pilot's view is obstructed by the nose portion 120 in its raised position. In one aspect of this embodiment, the camera 170 can be mounted to the fuselage 130. Alternatively, the camera 170 can be mounted to a landing gear 116 or a part of the nose portion 120 that becomes exposed when the nose portion 120 is moved to its second or raised position. In any of these embodiments, the camera 170 can move between a deployed position (shown in FIG. 3A) and a stowed position (for example, with the camera 170 retracted into the fuselage 130).

Figure 3B:
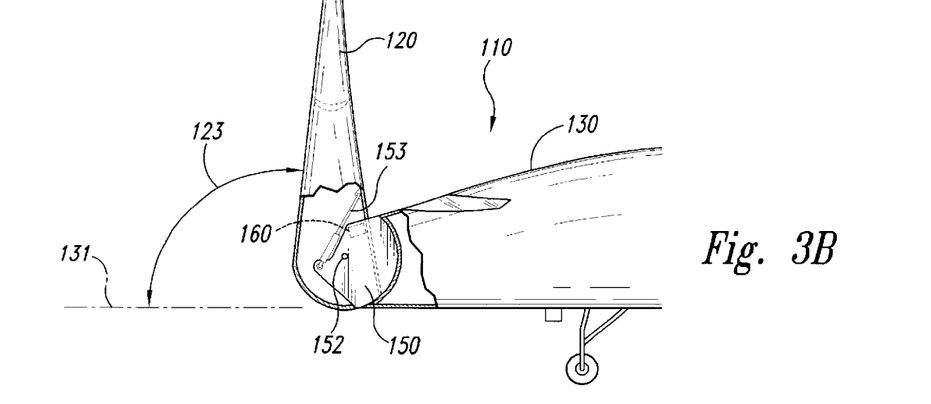
FIG. 3B is a partially schematic, side elevational view of an embodiment of the aircraft shown in FIG. 3A with the nose portion inclined upwardly in accordance with an embodiment of the invention.

FIG. 3B is a partially schematic, side elevational view of the aircraft 110 described above with the nose portion 120 in its second, raised position. In one embodiment, the nose portion 120 can be rotated relative to the longitudinal axis 131 by extending the actuator 153. When the nose portion 120 is in the raised position, it can have a non-zero inclination angle 123 relative to the longitudinal axis 131. In one aspect of this embodiment, the inclination angle 123 can be approximately 90 degrees, and in other embodiments, the inclination angle 123 can have other values. In any of these embodiments, raising the nose portion 120 can effectively shorten the overall length of the aircraft 110, as described in greater detail below with reference to FIG. 5.

Figure 3C:
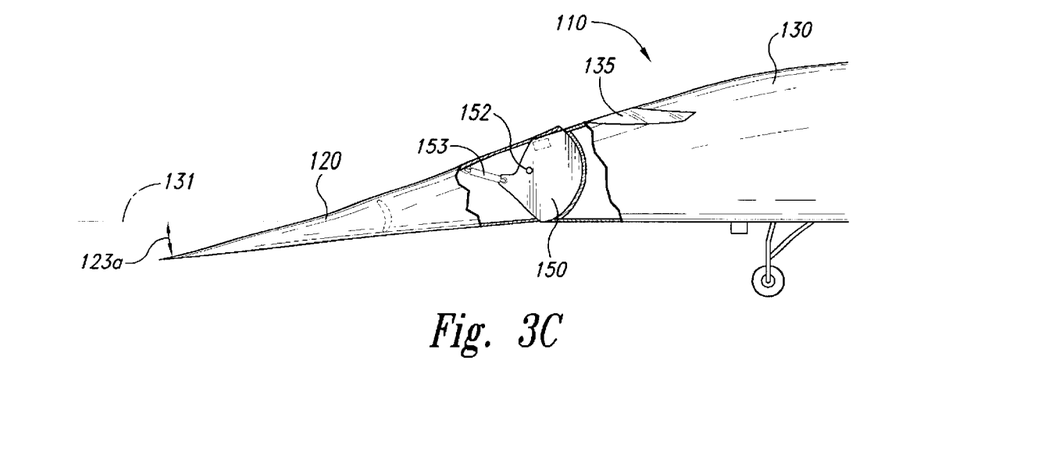
FIG. 3C is a partially schematic, side elevational view of an aircraft having a nose portion inclined downwardly in accordance with another embodiment of the invention.

FIG. 3C is a partially schematic, side elevational view of the aircraft 110 with the nose portion 120 moved to a third, drooped position. For example, the nose portion 120 can have a negative inclination angle 123a relative to the longitudinal axis 131. Accordingly, the pilot's visibility through the windshield 135 can be improved during high angle of attack operation, such as during approach and landing.

Figure 4A:
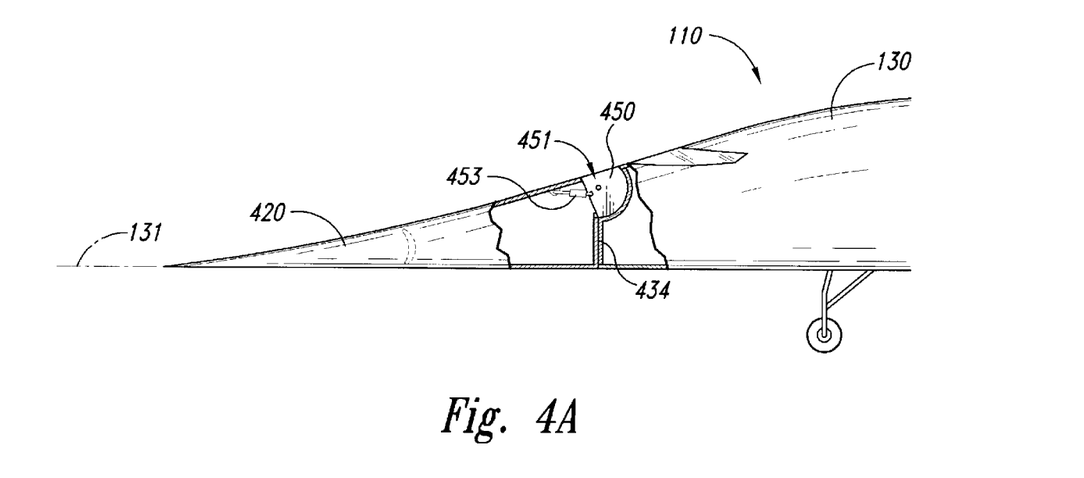
FIG. 4A is a partially schematic, side elevational view of an aircraft having a movable nose portion aligned with a longitudinal axis in accordance with yet another embodiment of the invention.
Figure 4B:
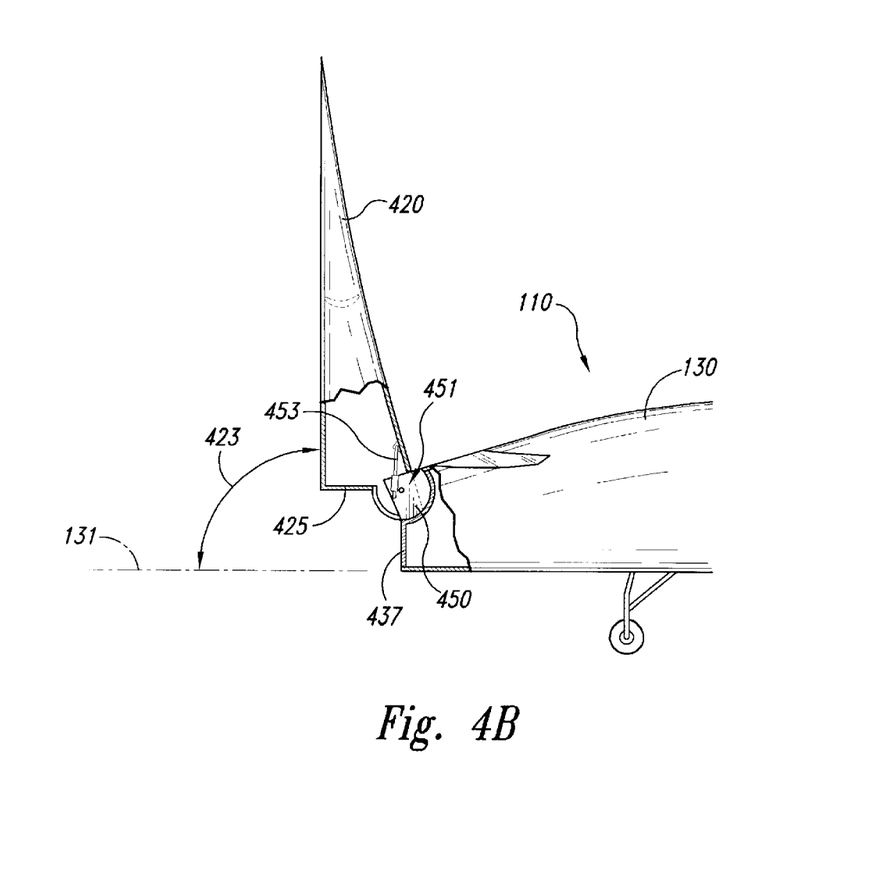
FIG. 4B is a partially schematic, side elevational view of the aircraft shown in FIG. 4A with the nose portion inclined upwardly in accordance with an embodiment of the invention.

FIGS. 4A and 4B illustrate an aircraft 110 having a nose portion 420 that is movable between two positions in accordance with another embodiment of the invention. Referring first to FIG. 4A, the aircraft 110 can include a fuselage 130 having a forward pressure bulkhead 434 that supports a pivot support member 450. The nose portion 420 can be pivotably coupled to the pivot support member 450 to rotate about a pivot axis 451 in a manner generally similar to that described above with reference to FIGS. 3A–B. Accordingly, the aircraft 410 can include an actuator 453 coupled between the pivot support member 450 and the nose portion 420 to rotate the nose portion 420 between a lowered position (shown in FIG. 4A) with the nose portion 420 generally aligned with the longitudinal axis 131, and a raised position (described in greater detail below with reference to FIG. 4B).

Referring now to FIG. 4B, the nose portion 420 can be moved to its raised position by extending the actuator 453 to rotate the nose portion 420 about the pivot axis 451. In one embodiment, the nose portion 420 can be rotated to an inclination angle 423 that is approximately 90 degrees relative to the aircraft longitudinal axis 131. Alternatively, the inclination angle 423 can have other values, greater or less than 90 degrees, in other embodiments. In another embodiment, the nose portion 420 can have an aft-facing surface 425 (such as a rim) that engages (and optionally seals against) a corresponding forward-facing surface 437 of the fuselage 130 to prevent the nose portion 420 from over-rotating downwardly when it is returned to its first position (FIG. 4A). In any of these embodiments, raising the nose portion 420 can effectively decrease the overall length of the aircraft 110, which can enhance the compatibility of the aircraft with conventional terminal structures, as described below with reference to FIG. 5.

Figure 5:
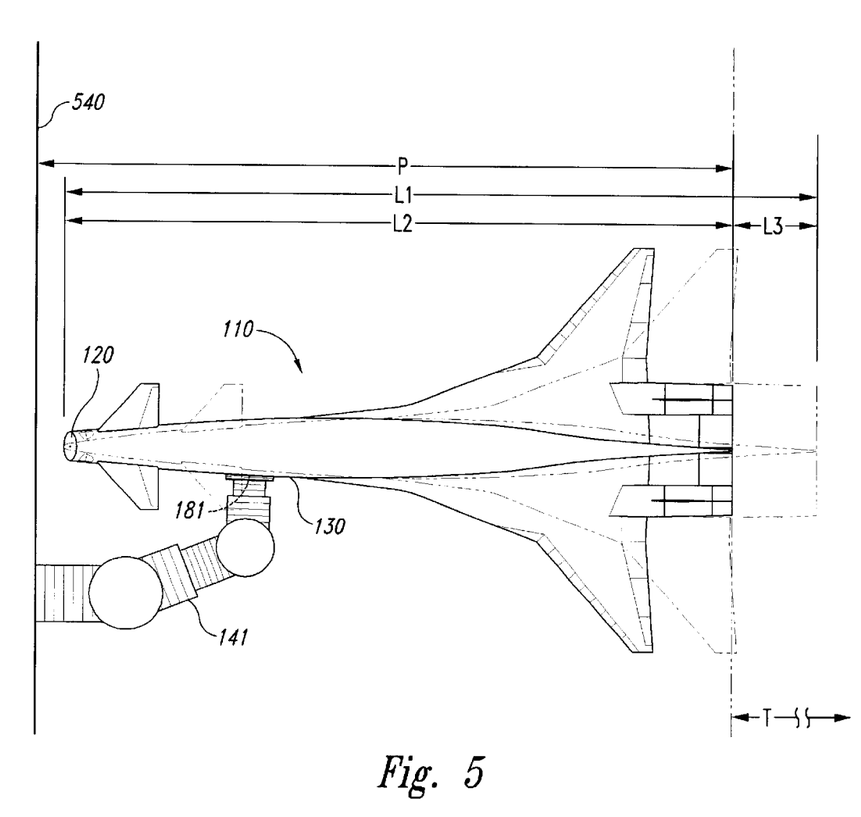
FIG. 5 is a partially schematic, top plan view of an aircraft having a movable nose portion and being positioned at a terminal in accordance with an embodiment of the invention.

FIG. 5 is a plan view of the aircraft 110 described above with reference to FIG. 1 having a nose portion 120 generally similar to that described above with reference to FIGS. 2–3C. Alternatively, the aircraft 110 can have an overall configuration generally similar to that shown in FIG. 2, and/or a nose portion generally similar to that described above with reference to FIGS. 4A–B. In any of these embodiments, the aircraft 110 can be positioned proximate to a terminal structure 540 for loading and/or unloading. The region adjacent to the terminal structure 540 can include a parking area (for aircraft loading and unloading) extending for a distance P away from the terminal structure 540. A taxi area T can be positioned immediately behind the parking area and can be sized to allow other aircraft to pass behind the aircraft 110 while the aircraft 110 is parked at the terminal structure 540. Accordingly, aircraft regulations (for example, those promulgated by the International Civil Aviation Organization., or ICAO) require that the aircraft 110 not extend aft into the taxi area T while parked at the terminal 540. For example, many conventional aircraft parking areas have a distance P of 80 meters. Thus, aircraft having a length of greater than 80 meters cannot park at the terminal structure 540 without encroaching on the taxi area T. Even aircraft having a length slightly less than 80 meters may not be able to park at the terminal structure 540 without encroaching on the taxi area T because the aircraft must typically be separated from the terminal structure 540 by a selected offset distance, such as from about 4.5 meters to about 9 meters or more.

As shown in FIG. 5, the aircraft 110 can have an overall length L1 when the nose portion 120 is in its first or lowered position (shown in broken lines in FIG. 5) and will accordingly encroach on the taxi area T. When the aircraft 110 has the nose portion 120 moved to its second or raised position (as shown in solid lines in FIG. 5), the overall length of the aircraft 110 can be reduced by L3 (approximately the length of the nose portion 120), from L1 to L2. Accordingly, the aircraft 110 can be moved close enough to the terminal structure 540 so that the aft portion of the aircraft 110 does not extend into the taxi area T.

In one embodiment, the length L3 can be about 5 percent or more of the overall length L1 of the aircraft 110. For example, in one particular embodiment, the length L3 can be approximately 10 percent of the overall length L1 of the aircraft 110. In another embodiment, the length L3 can approximately 13 percent of the overall length L1 of the aircraft 110. In a particular embodiment, the aircraft 110 can have a length L1 (with the nose portion 120 in its first position) of approximately 85 meters and a length L2 (with the nose portion 120 in its raised position) of approximately 74.5 meters. In other embodiments, the actual dimensions and the percentage of the overall aircraft length occupied by the movable nose portion 120 can have other values, so long as the overall length of the aircraft 110 can be reduced by moving the nose portion 120. In any of these embodiments, the distance P between the terminal structure 540 (or another obstacle at the same elevation as the nose portion 120) and the aftmost point of the aircraft 110 can be less than the initial length L1 of the aircraft 110.

Operation of an embodiment of the aircraft 110 is described below with reference to FIGS. 1–5. During cruise operation, the aircraft 110 can have the nose portion 120 in the first position, generally aligned with the longitudinal axis 131 as shown in FIGS. 1, 3A and 4A. When the aircraft is on landing approach, the nose portion 120 can be drooped, as shown in FIG. 3C. Alternatively, the nose portion can remain in the position shown in FIG. 3A or 4A. Upon landing, the aircraft 110 can taxi with the nose portion 120 in either the first position (FIG. 3A or 4A) or the third position (FIG. 3C). As the aircraft nears the gate area (for example, just prior to turning directly toward the terminal structure 540 shown in FIG. 5), the pilot can issue a command to raise the nose portion 120 from the first position to the second position. The pilot's command can unlock the restraint 160 (FIG. 3A) and activate the actuator 153 (FIG. 3A). The nose portion 120 can accordingly move from the first position to the second or raised position shown in FIGS. 3B and 4B. The restraint 160 can then lock the nose portion 120 in the second position. The aircraft 110 can then continue forward toward the terminal structure 540 with guidance from either a ground lineman or the camera 170. After the aircraft 110 has been unloaded and/or loaded and pushed back from the terminal structure 540, the nose portion 120 can be returned to the lowered position for taxi and takeoff.

One feature of an embodiment of the aircraft described above with reference to FIGS. 1–5 is that the nose portion can be raised to an inclined position relative to the longitudinal axis of the aircraft while the aircraft is on the ground. An advantage of this arrangement is that the overall length of the aircraft can be reduced and can make the aircraft more manageable when on the ground.

For example, the aircraft can be positioned at gates and/or other unloading areas that typically require an aircraft length shorter than the overall length L1 of the aircraft shown in FIG. 5.

Another advantage of the foregoing features is that the aircraft can have an improved efficiency at cruise Mach numbers. For example, the aircraft can have a greater fineness ratio (aircraft length divided by aircraft diameter), which can improve the aerodynamic efficiency relative to a blunt nosed aircraft. Accordingly, the aircraft can be more efficient to operate and can therefore reduce operating costs.

Still another advantage of the foregoing features is that the nose portion can be configured as a separate sub-assembly and can be attached to the aircraft relatively late in the aircraft manufacturing process. For example, in one embodiment, the nose portion can be attached to the aircraft after all major internal and external sub-assemblies have been put together and/or after the aircraft has been painted. Accordingly, the aircraft can occupy less floor space during manufacture and can accordingly reduce the cost of manufacture.

From the foregoing, it will be appreciated that specific embodiments of the invention have been described herein for purposes of illustration, but that various modifications may be made without deviating from the spirit and scope of the invention. For example, the configuration of the nose portion can be changed by moving the nose portion in manners other than pivoting the nose portion. In one embodiment, the nose portion can be telescoped along an axis generally aligned with the fuselage axis between a first position and a second position, and in other embodiments, the nose portion can undergo other configuration changes to reduce the overall aircraft length. Accordingly, the invention is not limited except as by the appended claims.

I claim:

1. An aircraft, comprising:
    a fuselage having a longitudinal axis and a pitch axis generally transverse to the longitudinal axis, the fuselage including:
        a pressure bulkhead extending transversely to the longitudinal axis;
        a pressurized payload portion aft of the pressure bulkhead; and
        a nose portion forward of the pressure bulkhead, the nose portion being pivotable relative to the pressurized payload portion about a pivot axis generally parallel to the pitch axis while the pressurized payload portion is capable of being pressurized relative to a region external to the aircraft, the nose portion being pivotable between a first position and a second position, the nose portion being generally aligned with the longitudinal axis when the nose portion is in the first position, the nose portion being inclined upwardly relative to the longitudinal axis when the nose portion is in the second position.

2. The aircraft of claim 1, further comprising:
    a pivot support member projecting forward of the pressure bulkhead, the pivot support member being received in a corresponding slot of the nose portion;
    a pivot pin pivotably coupled between the pivot support member and the nose portion; and
    an actuator carried by the pivot support member, the actuator being operatively coupled to the nose portion to move the nose portion between the first position and the second position.

3. The aircraft of claim 1 wherein the nose portion is inclined upwardly at an angle of approximately 90 degrees relative to the longitudinal axis when in the second position.

4. The aircraft of claim 1 wherein the nose portion is pivotable relative to the pressurized payload portion to a third position with the nose portion being inclined downwardly relative to the longitudinal axis when in the third position.

5. The aircraft of claim 1 wherein the nose portion has a contact surface positioned to contact the fuselage when the nose portion is in the first position to prevent over-rotation of the nose portion.

6. The aircraft of claim 1, further comprising a restraint operatively coupled to the nose portion to selectively prevent and allow motion of the nose portion.

7. The aircraft of claim 1 wherein the fuselage has a fuselage length and wherein the nose portion has a nose portion length, the nose portion length being at least about 10 percent of the combined fuselage length and nose portion length.

8. The aircraft of claim 1 wherein the fuselage has a fuselage length and wherein the nose portion has a nose portion length, the nose portion length being about 13 percent of the combined fuselage length and nose portion length.

9. The aircraft of claim 1, further comprising:
    a wing coupled to the fuselage; and
    a propulsion system operatively coupled to at least one of the wing and the fuselage, and wherein the fuselage, the wing and the propulsion system are configured for sustained subsonic cruise at a Mach number of about 0.95 or greater.

10. The aircraft of claim 1, further comprising:
    a wing coupled to the fuselage; and
    a propulsion system operatively coupled to at least one of the wing and the fuselage, and wherein the fuselage, the wing and the propulsion system are configured for sustained cruise at a supersonic Mach number.

11. The aircraft of claim 1 wherein the nose portion is configured to move between the first position and the second position based on an input command from a pilot of the aircraft.

12. The aircraft of claim 1, further comprising a radar housed in the nose portion.

13. The aircraft of claim 1 wherein a pressure within the pressurized payload portion is independent of a pressure within the nose portion during operation.

14. The aircraft of claim 1, further comprising a camera coupled to the aircraft and operatively linked to a flight deck of the aircraft, the camera being positioned to transmit to the flight deck an image of a region forward of the aircraft.

15. An aircraft, comprising:
    a fuselage having a longitudinal axis and a pitch axis generally transverse to the longitudinal axis, the fuselage including:
        a pressure bulkhead extending from a position at least proximate to an upward facing surface of the fuselage to a Position at least proximate to a downward facing surface of the fuselage;
        a pressurized payload portion aft of the pressure bulkhead; and
        a nose portion forward of the pressure bulkhead, the nose portion being pivotable relative to the pressurized payload portion about a pivot axis generally parallel to the pitch axis while the pressurized payload portion is capable of being pressurized relative to a region external to the aircraft, the nose portion being pivotable between a first position with the nose portion generally aligned with the longitudinal axis, and a second position with the nose portion being inclined upwardly relative to the longitudinal axis, the nose portion being configured to withstand an internal pressure less than an internal pressure of the pressurized payload portion during operation.

16. The aircraft of claim 15 wherein the nose portion is configured to have an internal pressure approximately equal to a pressure external to the nose portion.

17. The aircraft of claim 15 wherein the nose portion is inclined upwardly at an angle of approximately 90 degrees relative to the longitudinal axis when in the second position.

18. The aircraft of claim 15 wherein the nose portion is pivotable relative to the pressurized payload portion to a third position with the nose portion being inclined downwardly relative to the longitudinal axis when in the third position.

19. The aircraft of claim 15 wherein the fuselage has a fuselage length and wherein the nose portion has a nose portion length, the nose portion length being about 10 percent of the combined fuselage length and nose portion length.

20. The aircraft of claim 15 wherein the fuselage has a fuselage length and wherein the nose portion has a nose portion length, the nose portion length being about 13 percent of the combined fuselage length and nose portion length.

21. The aircraft of claim 15 wherein a pressure within the pressurized payload portion is independent of a pressure within the nose portion during operation.

22. The aircraft of claim 15, further comprising a camera coupled to the aircraft and operatively linked to a flight deck of the aircraft, the camera being positioned to transmit to the flight deck an image of a region forward of the aircraft.

23. An aircraft, comprising:
a fuselage having a longitudinal axis and a pitch axis generally transverse to the longitudinal axis, the fuselage further having a fuselage length and including:
a pressurized payload portion; and
a nose portion forward of the pressurized payload portion, the nose portion being movable relative to the pressurized payload portion to change from a first configuration with the nose portion and the fuselage having a combined first length to a second configuration with the nose portion and the fuselage having a combined second length about 5 percent or more shorter than the first length.

24. The aircraft of claim 23 wherein the nose portion is inclined upwardly at an angle of approximately 90 degrees relative to the longitudinal axis when in the second configuration.

25. The aircraft of claim 23 wherein the nose portion is pivotable relative to the pressurized payload portion to a third configuration with the nose portion being inclined downwardly relative to the longitudinal axis when in the third configuration.

26. The aircraft of claim 23 wherein the fuselage has a fuselage length and wherein the nose portion has a nose portion length, the nose portion length being about 13 percent of the combined fuselage length and nose portion length.

27. The aircraft of claim 23 wherein a pressure within the pressurized payload portion is independent of a pressure within the nose portion during operation.

28. The aircraft of claim 23, further comprising a camera coupled to the aircraft and operatively linked to a flight deck of the aircraft, the camera being positioned to transmit to the flight deck an image of a region forward of the aircraft.

29. The aircraft of claim 23 wherein the nose portion is pivotable between the first configuration and the second configuration.

30. An aircraft, comprising:
a fuselage having a longitudinal axis and a pitch axis generally transverse to the longitudinal axis, the fuselage including:
a pressurized payload portion;
a nose portion, the nose portion being pivotable relative to the pressurized payload portion about a pivot axis generally parallel to the pitch axis, the nose portion being pivotable between a first position with the nose portion generally aligned with the longitudinal axis and a second position with the nose portion being inclined upwardly relative to the longitudinal axis, wherein the aircraft is configured for forward flight when the nose portion is in the first position, and wherein the aircraft is configured for ground taxi when the nose portion is in the second position; and
a restraint operatively coupled to the nose portion to prevent motion of the nose portion to the second position while the aircraft is in flight.

31. The aircraft of claim 30 wherein the nose portion is inclined upwardly at an angle of approximately 90 degrees relative to the longitudinal axis when in the second position.

32. The aircraft of claim 30 wherein the nose portion is pivotable relative to the pressurized payload portion to a third position with the nose portion being inclined downwardly relative to the longitudinal axis when in the third position.

33. The aircraft of claim 30 wherein the fuselage has a fuselage length and wherein the nose portion has a nose portion length, the nose portion length being at least about 10 percent of the combined fuselage length and nose portion length.

34. The aircraft of claim 30 wherein a pressure within the pressurized payload portion is independent of a pressure within the nose portion during operation.

35. The aircraft of claim 30, further comprising a camera coupled to the aircraft and operatively linked to a flight deck of the aircraft, the camera being positioned to transmit to the flight deck an image of a region forward of the aircraft.

36. An aircraft, comprising:
a fuselage having a longitudinal axis and a pitch axis generally transverse to the longitudinal axis, the fuselage including:
a pressure bulkhead extending from a position at least proximate to an upward facing surface of the fuselage to a position at least proximate to a downward facing surface of the fuselage;
a pressurized payload portion aft of the pressure bulkhead;
a nose portion forward of the pressure bulkhead, the nose portion being pivotable relative to the pressurized payload portion about a pivot axis generally parallel to the pitch axis while the pressurized payload portion is capable of being pressurized relative to a region external to the aircraft, the nose portion being pivotable between a first position and a second position, the nose portion being generally aligned with the longitudinal axis when in the first position, the nose portion being inclined upwardly relative to the longitudinal axis when in the second position; and
a restraint operatively coupled to the nose portion to generally prevent motion of the nose portion during flight.

37. The aircraft of claim 36 wherein the nose portion is inclined upwardly at an angle of approximately 90 degrees relative to the longitudinal axis when in the second position.

38. The aircraft of claim 36 wherein the restraint is releasable during taxi operations.

39. The aircraft of claim 36 wherein the fuselage has a fuselage length and wherein the nose portion has a nose portion length, the nose portion length being about 13 percent of the combined fuselage length and nose portion length.

40. The aircraft of claim 36 wherein a pressure within the pressurized payload portion is independent of a pressure within the nose portion during operation.

41. The aircraft of claim 36, further comprising a camera coupled to the aircraft and operatively linked to a flight deck of the aircraft, the camera being positioned to transmit to the flight deck an image of a region forward of the aircraft.

42. An aircraft, comprising:
a fuselage having a longitudinal axis and a pitch axis generally transverse to the longitudinal axis, the fuselage including:
a pressure bulkhead;
a pressurized payload portion aft of the pressure bulkhead; and
a nose portion forward of the pressure bulkhead, the nose portion being pivotable relative to the pressurized payload portion among three positions about a pivot axis generally parallel to the pitch axis, the nose portion being generally aligned with the longitudinal axis when in a first position, the nose portion being inclined upwardly relative to the longitudinal axis when in a second position, and the nose portion being inclined downwardly relative to the longitudinal axis when in a third position.

43. The aircraft of claim 42 wherein the fuselage has a fuselage length and wherein the nose portion has a nose portion length, and wherein the nose portion length is about 13 percent of the combined fuselage length and nose portion length.

44. The aircraft of claim 42 wherein a pressure within the pressurized payload portion is independent of a pressure within the nose portion during operation.

45. The aircraft of claim 42, further comprising a camera coupled to the aircraft and operatively linked to a flight deck of the aircraft, the camera being positioned to transmit to the flight deck an image of a region forward of the aircraft.

46. An aircraft, comprising:
a fuselage having a longitudinal axis and a pitch axis generally transverse to the longitudinal axis, the fuselage further having a fuselage length and including:
a pressure bulkhead;
a pressurized payload portion aft of the pressure bulkhead,
a pivot support member projecting forward of the pressure bulkhead; and
a nose portion forward of the pressure bulkhead, the nose portion being pivotably coupled to the pivot support member to pivot relative to the pressurized payload portion about the pitch axis while the pressurized payload portion is capable of being pressurized relative to a region external to the aircraft, the nose portion being pivotable between a first position and a second position, the nose portion being generally aligned with the longitudinal axis when in the first position, the nose portion being inclined upwardly relative to the longitudinal axis when in the second position, the nose portion having a nose portion length of at least about 10 percent of the combined fuselage length and nose portion length.

47. The aircraft of claim 46 wherein the nose portion is inclined upwardly at an angle of approximately 90 degrees relative to the longitudinal axis when in the second position.

48. The aircraft of claim 46 wherein the nose portion has a nose portion length of about 13 percent of the combined fuselage length and nose portion length.

49. An aircraft, comprising:
fuselage means having a longitudinal axis and a pitch axis generally transverse to the longitudinal axis, the fuselage means including:
pressure barrier means extending from a position at least proximate to an upward facing surface of the fuselage means to a position at least proximate to a downward facing surface of the fuselage means;
a pressurized payload portion aft of the pressure barrier means; and
nose means forward of the pressure barrier means, the nose means being pivotable relative to the pressurized payload portion about a pivot axis generally parallel to the pitch axis while the pressurized payload portion is capable of being pressurized relative to a region external to the aircraft, the nose means being pivotable between a first position and a second position, the nose means being generally aligned with the longitudinal axis when the nose means are in the first position, the nose means being inclined upwardly relative to the longitudinal axis when the nose means are the second position.

50. The aircraft of claim 49 wherein the nose means are inclined upwardly at an angle of approximately 90 degrees relative to the longitudinal axis when in the second position.

51. The aircraft of claim 49 wherein the fuselage means have a fuselage means length and wherein the nose means have a nose means length of at least about 10 percent of the combined fuselage means length and nose means length.

52. The aircraft of claim 49 wherein a pressure within the pressurized payload portion is independent of a pressure within the nose means during operation.

53. A method for reducing a length of an aircraft during operation, comprising:
flying the aircraft while the aircraft has a first length;
landing the aircraft;
reducing the length of the aircraft to a second length by pivoting a nose portion of the aircraft upwardly;
moving the aircraft with the second length relative to an unloading area; and
unloading the aircraft at the unloading area only through one or more openings that are spaced apart from the nose portion.

54. The method of claim 53 wherein unloading the aircraft at the unloading area includes moving a jetway at least proximate to the aircraft and moving passengers through the jetway to and from the aircraft.

55. The method of claim 53, further comprising pivoting the nose portion downwardly while the aircraft is in flight.

56. The method of claim 53 wherein pivoting the nose portion includes pivoting the nose portion upwardly at an angle of approximately 90 degrees relative to a longitudinal axis of the aircraft.

57. The method of claim 53 wherein reducing the length of the aircraft includes reducing the length by at least about 10 percent.

58. The method of claim 53 wherein reducing the length of the aircraft includes reducing the length by about 13 percent.

59. The method of claim 53 wherein flying the aircraft includes flying the aircraft at a sustained subsonic cruise Mach number of about 0.95 or greater.

60. The method of claim 53 wherein flying the aircraft includes flying the aircraft at a sustained supersonic cruise Mach number.

61. The method of claim 53, further comprising pressurizing a pressurized payload portion of the aircraft independently of a pressure within the nose portion.

62. The method of claim 53, further comprising viewing an image of a region external to the aircraft via a camera coupled to the aircraft while the nose portion is pivoted upwardly.

63. A method for reducing a length of an aircraft during operation, the aircraft having a nose portion with a forwardmost tip, an aft portion with an aftmost tip and a first length between the forwardmost tip and the aftmost tip, the method comprising:
   moving the aircraft toward an unloading area having an obstacle at the same elevation as the nose portion;
      pivoting the nose portion of the aircraft upwardly from a first position with the nose portion generally aligned with a longitudinal axis of the aircraft to a second position with the nose portion inclined upwardly relative to the longitudinal axis at least until the aircraft has a second length less than the first length;
   moving the aircraft with the nose portion in the second position toward the obstacle at least until a distance between the obstacle and the aftmost tip is less than the first length of the aircraft; and
   unloading the aircraft at the unloading area.

64. The method of claim 63 wherein moving the aircraft toward an obstacle includes moving the aircraft toward an air terminal structure.

65. The method of claim 63 wherein unloading the aircraft at the unloading area includes moving a jetway at least proximate to the aircraft and moving passengers through the jetway to and from the aircraft.

66. The method of claim 63, further comprising pivoting the nose portion downwardly while the aircraft is in flight.

67. The method of claim 63 wherein pivoting the nose portion includes pivoting the nose portion upwardly at an angle of approximately 90 degrees relative to a longitudinal axis of the aircraft.

68. The method of claim 63 wherein reducing the length of the aircraft includes reducing the length by about 13 percent.

69. The method of claim 63, further comprising pressurizing a pressurized payload portion of the aircraft independently of a pressure within the nose portion.

70. The method of claim 63, further comprising viewing an image of a region external to the aircraft via a camera coupled to the aircraft while the nose is in an upwardly pivoted position.

71. A method for operating an aircraft having a pivotable nose portion, comprising:
   at least partially sealing a pressurized portion of a fuselage of the aircraft so the pressurized portion is capable of being pressurized relative to a region external to the fuselage, the fuselage having a longitudinal axis and a pitch axis generally transverse to the longitudinal axis, the fuselage further having a pressure bulkhead extending transversely to the longitudinal axis; and
   pivoting a nose portion of the aircraft relative to the pressurized portion about a pivot axis generally parallel to the pitch axis, wherein pivoting includes pivoting the nose portion from a first position with the nose portion generally aligned with the longitudinal axis to a second position with the nose portion inclined upwardly relative to the longitudinal axis while the pressurized portion is capable of being pressurized relative to a region external to the fuselage.

72. The method of claim 71, further comprising unloading the aircraft at an unloading gate by moving a jetway at least proximate to the aircraft and moving passengers through the jetway to and from the aircraft.

73. The method of claim 71, further comprising pivoting the nose portion downwardly while the aircraft is in flight or in preparation for flight.

74. The method of claim 71 wherein pivoting the nose portion includes pivoting the nose portion upwardly at an angle of approximately 90 degrees relative to a longitudinal axis of the aircraft.

75. The method of claim 71 wherein pivoting the nose portion of the aircraft includes reducing a length of the aircraft by at least about 10 percent.

76. The method of claim 71, further comprising pressurizing a pressurized payload portion of the aircraft independently of a pressure within the nose portion.

77. The method of claim 71, further comprising viewing an image of a region external to the aircraft via a camera coupled to the aircraft while the nose portion is pivoted upwardly.

78. A method for reducing a length of an aircraft during operation, comprising:
   flying the aircraft while the aircraft has a first length;
   landing the aircraft;
   changing a configuration of a nose portion of the aircraft to reduce the length of the aircraft to a second length, the second length being about 5 percent or more shorter than the first length; and
   unloading the aircraft at an unloading area through one or more openings that are spaced apart from the nose portion.

79. The method of claim 78 wherein changing the configuration of the nose portion includes pivoting the nose portion upwardly from a first position with the nose portion aligned with a longitudinal axes of a fuselage of the aircraft to a second position inclined upwardly from the first position.

80. An aircraft, comprising:
   a fuselage having a longitudinal axis and a pitch axis generally transverse to the longitudinal axis, the fuselage including:
      a pressure bulkhead;
      a pressurized payload portion aft of the pressure bulkhead; and
      a nose portion forward of the pressure bulkhead, the nose portion being pivotable relative to the pressurized payload portion about a pivot axis generally parallel to the pitch axis, the nose portion being pivotable between a first position and a second position, the nose portion being generally aligned with the longitudinal axis when the nose portion is in the first position, the nose portion being inclined upwardly relative to the longitudinal axis when the nose portion is in the second position, wherein a pressure within the pressurized payload portion is independent of a pressure within the nose portion during operation.

81. An aircraft, comprising:

a fuselage having a longitudinal axis and a pitch axis generally transverse to the longitudinal axis, the fuselage including:
a pressure bulkhead;
a pressurized payload portion aft of the pressure bulkhead; and
a nose portion forward of the pressure bulkhead, the nose portion being pivotable relative to the pressurized payload portion about a pivot axis generally parallel to the pitch axis while the pressurized payload portion is capable of being pressurized relative to a region external to the aircraft, the nose portion being pivotable between a first position with the nose portion generally aligned with the longitudinal axis, and a second position with the nose portion being inclined upwardly relative to the longitudinal axis, the nose portion being configured to withstand an internal pressure less than an internal pressure of the pressurized payload portion during operation, wherein the nose portion is configured to have an internal pressure approximately equal to a pressure external to the nose portion.

82. A method for operating an aircraft having a pivotable nose portion, comprising:

at least partially sealing a pressurized portion of a fuselage of the aircraft so the pressurized portion is capable of being pressurized relative to a region external to the fuselage, the fuselage having a longitudinal axis and a pitch axis generally transverse to the longitudinal axis;

pivoting a nose portion of the aircraft relative to the pressurized portion about a pivot axis generally parallel to the pitch axis, wherein pivoting includes pivoting the nose portion from a first position with the nose portion generally aligned with the longitudinal axis to a second position with the nose portion inclined upwardly relative to the longitudinal axis while the pressurized portion is capable of being pressurized relative to a region external to the fuselage; and unloading the aircraft at an unloading gate by moving a jetway at least approximate to the aircraft and moving passengers through the jetway to and from the aircraft.

* * * * *